United States Patent
Kaever et al.

(10) Patent No.: US 7,016,759 B2
(45) Date of Patent: Mar. 21, 2006

(54) ACTIVE RESOURCE CONTROL SYSTEM METHOD & APPARATUS

(75) Inventors: Michael Kaever, Erlangen (DE); Rainer Dirnfeldner, Herzogenaurach (DE)

(73) Assignee: Siemens Aktiengesellschaft, Munich (DE)

(*) Notice: Subject to any disclaimer, the term of this patent is extended or adjusted under 35 U.S.C. 154(b) by 77 days.

(21) Appl. No.: 10/227,087

(22) Filed: Aug. 23, 2002

(65) Prior Publication Data
US 2004/0039477 A1 Feb. 26, 2004

(51) Int. Cl.
G06F 19/00 (2006.01)

(52) U.S. Cl. .................. 700/173; 700/17; 700/96; 700/159; 702/186

(58) Field of Classification Search .............. 700/17, 700/28, 83, 90, 159, 169, 173, 96; 702/186
See application file for complete search history.

(56) References Cited

U.S. PATENT DOCUMENTS

| | | | |
|---|---|---|---|
| 5,452,201 A * | 9/1995 | Pieronek et al. ............. 700/83 |
| 5,726,912 A * | 3/1998 | Krall et al. ................. 702/186 |
| 5,742,824 A | 4/1998 | Kosaka |
| 5,844,795 A | 12/1998 | Johnston et al. |
| 5,978,578 A * | 11/1999 | Azarya et al. ............... 717/100 |
| 6,338,003 B1 * | 1/2002 | Kamiguchi et al. ......... 700/169 |
| 6,473,656 B1 * | 10/2002 | Langels et al. .............. 700/17 |

FOREIGN PATENT DOCUMENTS

EP 0 512 116 A1 11/1992

OTHER PUBLICATIONS

Edgar Dittmar, "Using Computers For Control," Elektrotechnik, Vogel Verlag K.G., Worzburg, Germany, vol. 77, No. 1/2, Feb. 21, 1995, pp. 16, 18, 21-22.

* cited by examiner

Primary Examiner—Jayprakash N. Gandhi
(74) Attorney, Agent, or Firm—White & Case LLP

(57) ABSTRACT

Active resource control of added functionality in a numerical control process having at least one resource is provided. It can occur during run-time of the numerical control process, that an added functionality that uses at least a portion of the resource. On-line checking of the added functionality detects during run time whether the added functionality causes the numerical control process to reach a resource limit. Error handling handles errors upon reaching a resource limit. Off-line checking detects off-line, before the run time of the numerical control process, whether the added functionality causes the numerical control process to reach a resource limit of the resource. Multiple layers are provided that check at multiple layers of the numerical control process whether the added functionality causes the numerical control process to reach a resource limit of the resource. A flexible response to resource limit errors based on a degree of importance of the added functionality is provided.

30 Claims, 9 Drawing Sheets

ACTIVE RESOURCE CONTROL SYSTEM METHOD & APPARATUS

FIELD OF THE INVENTION

The present invention relates to Control of Automation Systems and, more particularly, to Active Resource Control of Automation Systems, particularly in a Run-Time Environment.

BACKGROUND OF THE INVENTION

In Automation Systems, software modules or functions may overburden the System Resources and cause the System to abort. This is particularly problematic when the modules or functions are not previously accounted for, such as when functions or modules are activated, added or loaded in a Real Time System. It can occur, in this circumstance, that the module or function overburdens the System Resources because the Resources are previously allocated to other functions. For example, a Resource can be overburdened upon start-up based on some change in the configuration of the System. Or, perhaps, the System can reach its Resource limit during the run of a Real-Time system when, for example, a function is activated, such as when activating a Trace Function of a Motion Control Machine.

In Industrial Automation, where the failure of a System can shut down an entire Factory, the present circumstance is not tolerable. Particularly, in the situation where the added function is non-essential, i.e., non-critical, it is not clear why the factory system is shut down as a result of the added function. It would be, for example, a disaster if a Laser Cutting Machine fails to move a work piece and the Laser is not turned off. Or, the work piece is moved too rapidly with respect to the cutting power of the Laser. On the other hand, some functions may be considered non-critical with respect to safety reasons of the machine. In such instances, aborting a Process for a non-critcial function failure, which would have the possible effect of halting a factory, is non-sensical.

What is needed that has not heretofore been provided is a Method, System & Apparatus for Active Resource Control that detects whether added functionality or modules overburdens System Resources. Particularly, in the context of activation or usage of additional, e.g., reloadable or dynamically loadable, software modules or functions in numerical controls, what is needed is Active Resource Control. Further, what is lacking is a means by which the Active Resource Control manages critical and less-critical add-on functionality.

SUMMARY OF THE INVENTION

The long felt, but unmet, needs described above are addressed by various aspects of the system and method according to the present invention.

In one aspect of the invention, active resource control of added functionality in a numerical control process having at least one resource is provided. It can occur during run-time of the numerical control process, that an added functionality that uses at least a portion of the resource overburdens an existing limitation of the resource. In an aspect of the invention there is provided multiple layers for actively detecting and responding to resource limit errors. These layers can be combined or employed separately.

In one aspect, on-line checking of the added functionality detects during run time whether the added functionality causes the numerical control process to reach a resource limit.

In another aspect, there is provided Error handling that handles errors upon reaching a resource limit.

In yet another aspect, off-line checking detects off-line, before the run time of the numerical control process, whether the added functionality causes the numerical control process to reach a resource limit of the resource.

The invention further provides a flexible response to resource limit errors based on a degree of importance of the added functionality.

Various other aspects of the system and method according to the present invention are illustrated, without limitation, in the appended claims.

DETAILED DESCRIPTION OF THE INVENTION

Figure 1:
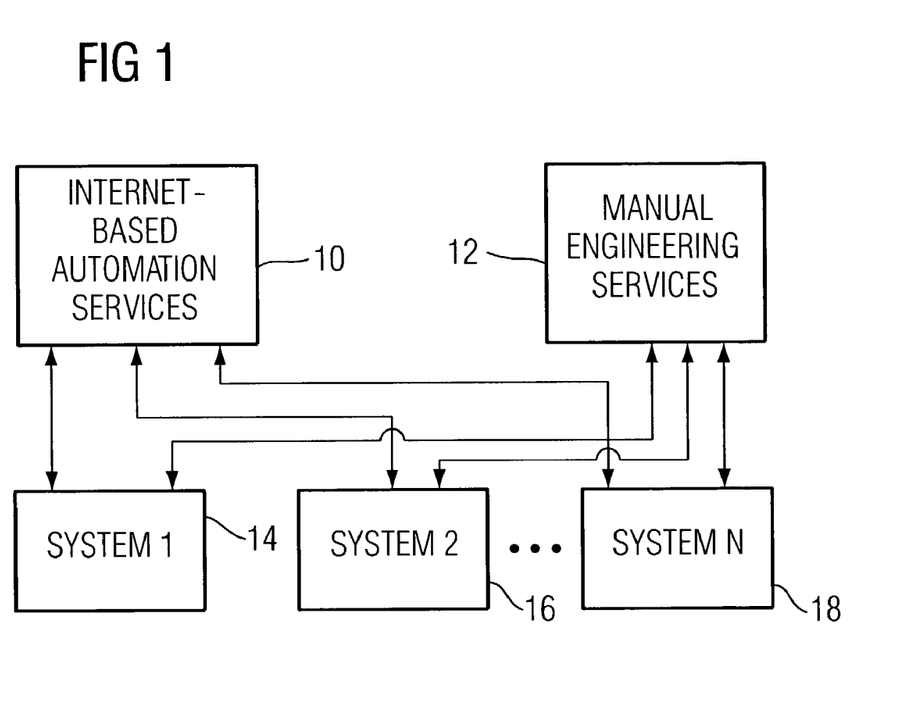
FIG. 1 is a block diagram of an example system in which the present invention is employed.

FIG. 1 is a block diagram of an example system in which the present invention is employed. In brief, an Automation Services Company 10 provides content comprising software, services and so forth, to a plurality of customers, represented by systems 1-N (reference numerals 14, 16, and 18, respectively). A provider of manual engineering services 12 (e.g., a Manufacturer), of which there may be a plurality, is in communication with the customer systems 1-N (12, 14, 16).

A more detailed explanation of the exemplary system will now be described with reference to FIG. 2. As shown, a Service provider 20 comprises a host 30 (referred to below simply as "host") in communication with a system/customer database 34 and an interactive user 32 that performs administrative or other functions. Any number of such databases 34 and interactive users 32 may interact with host 30.

An application programming interface (API) 36 makes possible for a Manufacturer partner 24 to deal with the content provided by the host 30. At the Manufacturer 24, one or more interactive users 40 interact with Manufacturer-partner host 38 for administration or other purposes. Content is also provided over network 25 as between host 30 and client 26. Client (or customer) 26 may comprise one or more controlled devices 42, such as a computer numerical controlled/programmable logic controller (CNC/PLC) systems, peripheral devices and sensors, controllers 44, personal computers 45 and host computers 46, some or all of which are in communication over an internal network 47. Of course, the present invention is not limited to numerical controlled devices, but encompasses Active Resource Control of all types of controlled devices.

Figure 2:
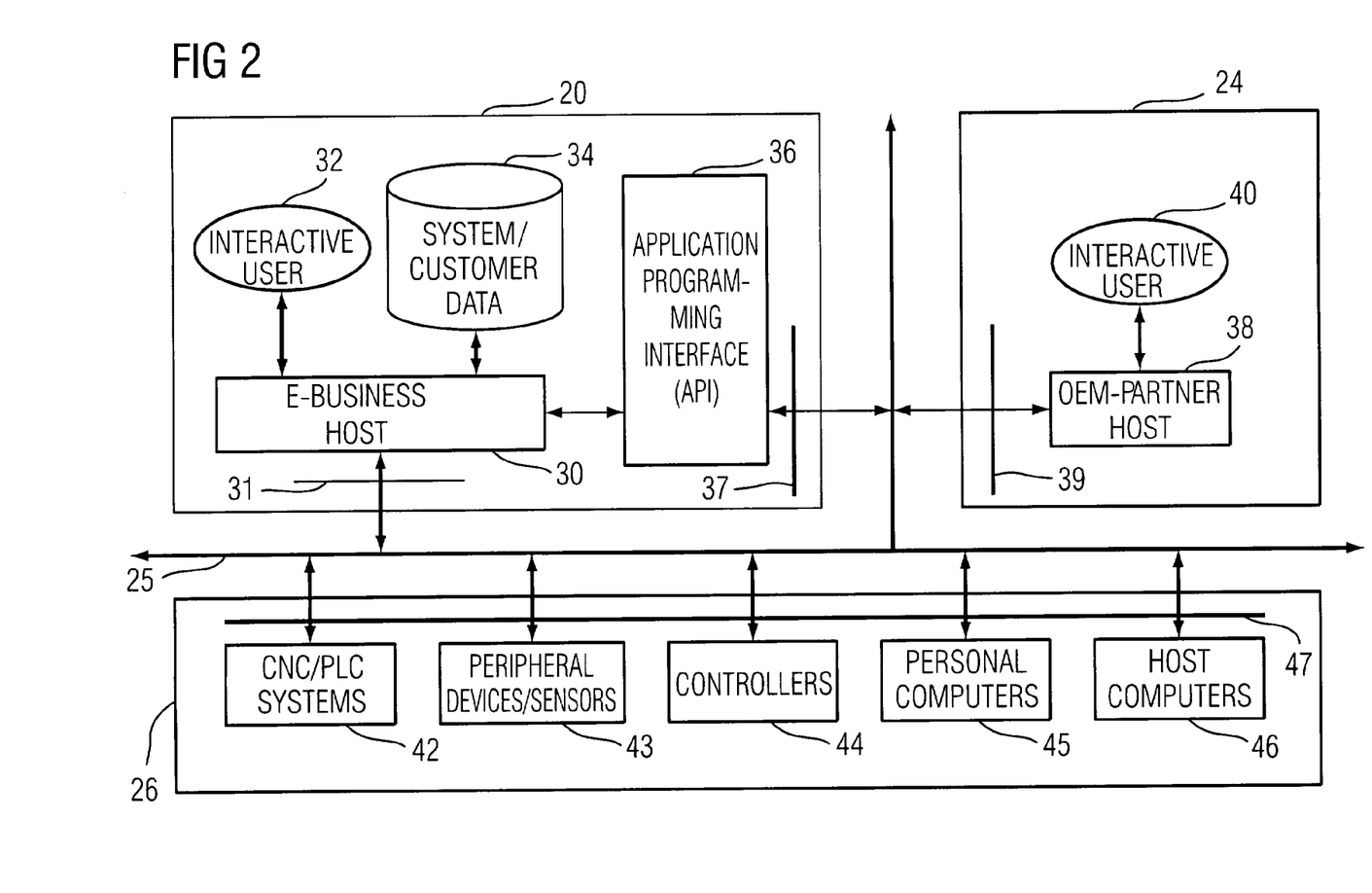
FIG. 2 is a block diagram showing a more detailed example system in which the present invention is employed.

Within the system shown in FIG. 2, the present invention provides Active Resource Control of a controlled device 42. As will be explained in more detail, the host 30 actively monitors and controls the resources of the controlled system 42. Data regarding status of the Resource(s) is stored in the database 34 and used by the host 30 to determine whether a particular Resource is overburdened.

In general, the steps for determining whether a resource is overloaded includes the step of measuring or estimating the free resources. In some instances, the resources can be determined from the operating system, which should know the time until the end of the cycle. This data can be passed from the O/S to the resource control. In such cases, the operating system should know the current amount of free memory/data storage and this is useful for executing the invention in every cycle.

The next step in the invention is to determine an estimated or a known future resource consumption resulting from the added functionality. It is preferred that, in the case of checking during the intervals of each cycle, the estimated or known resource consumption for the next step is determined. If, in some instances, the run-time of additional functionality is not known, but a worst-case estimation for sub-steps is known (e.g. each sub-step not more than 100 Microseconds) the worst-case limit may be used. The worst case estimation, in fact, may be used for some or all of the sub-steps instead of estimating resource usage individually for each sub-step (e.g. check at least each 100 us if more than 100 us processing time are left in cycle).

In addition to these steps, an additional step may be introduced. I the third step of the invention, a user-defined/configurable safety margin may be determined that takes account of uncertainties in the estimations if any. Under the circumstances where the first two steps can not reasonably be estimated, a user-specified limit may be employed. For example, if free resources can not be estimated, a user may specify an estimation of the free resources, that is, specify a limit for the resources an additional functionality may use. Rather, if resource usage of the additional functionality (or a step thereof) is not known, the user-estimation may be used instead. It could be, for example, that the minimum amount of resources remaining is a specified quantity for a particular operating system.

Figure 3:
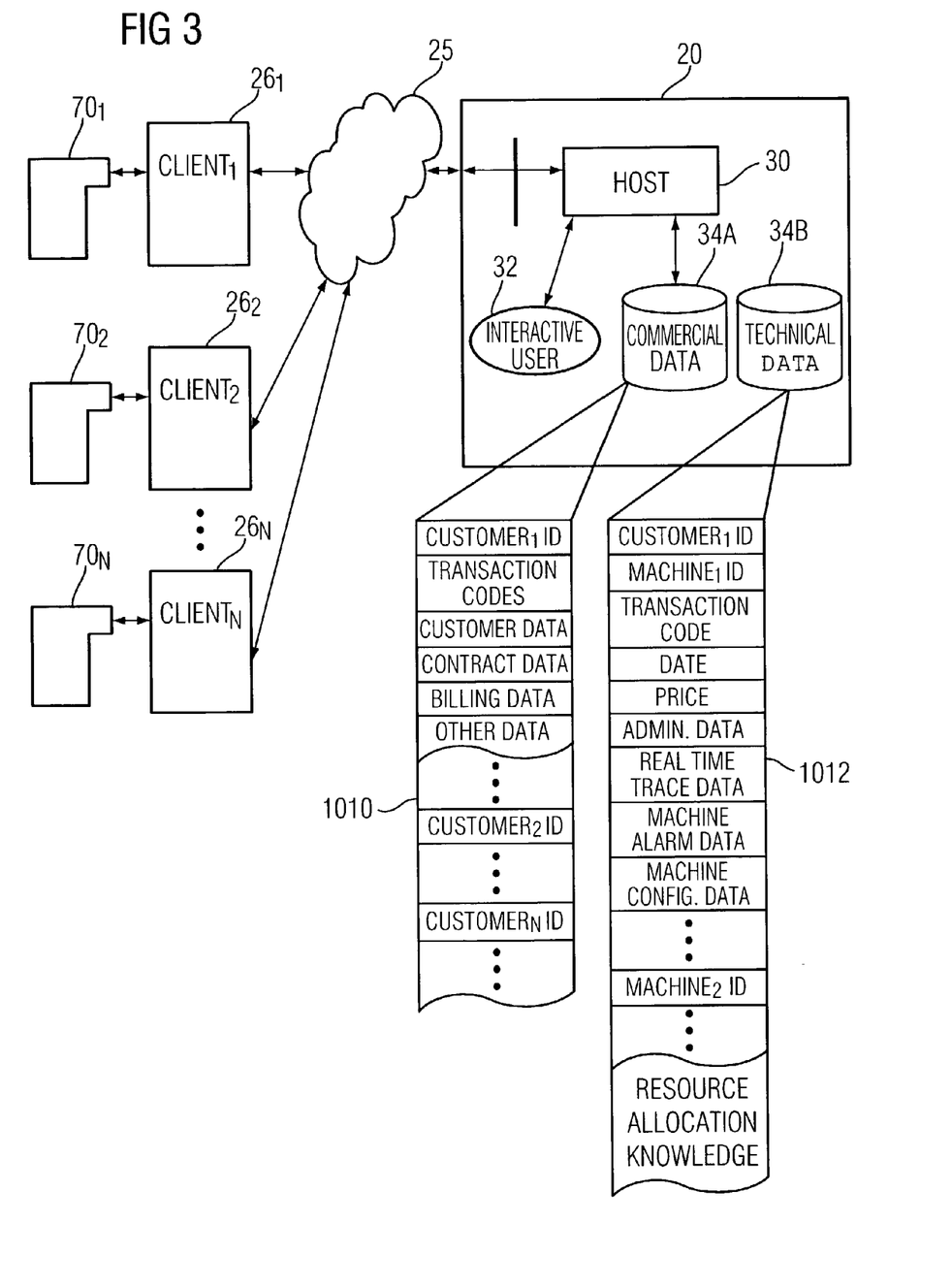
FIG. 3 is a schematic diagram illustrating from a database perspective of where the invention resides.

As shown in FIG. 3, which is a schematic perspective of the invention, the resource allocation data is stored in the technical database 34B. Of course, this merely an example, and can be stored in any suitable storage device. In any event, FIG. 3 further illustrates the architecture shown in FIG. 2, particularly demonstrating the connectivity between host 30 and a customer operating client system 26, or Manufacturer 24, or others, who may arrange for and obtain access to the databases.

As illustrated, service provider 20, through its host 30, provides network-delivered automation-related content to a plurality of client systems, $26_1$, $26_2$, . . . , $26_N$, each controlling a respective machine tool $70_1$, $70_2$, . . . , $70_N$. Host 30 writes data into databases, for example, a first database 34A comprising commercial data and a second database, 34B, comprising technical data. An example of a data structure corresponding to each of the databases is shown below each of the databases 34A and 34B.

An example of the content of data structure 1012, corresponding to database 34B will now be described. In an aspect of the invention, data structure 1012 comprises a plurality of data sets, one for each customer. Each customer data set within data structure 1012 may be recorded and accessed on the basis of the unique ID for that customer. Within the data for a given customer, there may be any number of sets of data corresponding to machines or client devices operated by the customer. Each such machine or client device is identified by a unique identifier or code, that is included in the data structure 1012.

As shown in the Figure, data is first organized by customer. Given that a customer is likely to have any number of machines for which service provider 20 may be able to provide content, a plurality of fields, each corresponding to machines operated by that customer, may be present within a given customer's data, each such machine ID (or client ID) being unique to the particular machine tool or other controlled equipment. Data structure 1012, thus, can provide a historical view of behavior over time for the particular machine.

In operation, the present invention accesses, for example, real time trace data relating to a Trace Function initiated on a Machine coupled to the host through the network. Based on the Resource Allocation Data stored in the Database 34B, the Active Resource Control determines whether the available Resource(s) will be overloaded by the added functionality. Of course, the Trace Function is but a single example of the various Functions that could overload System Resources that would trigger the Active Resource Control Mechanism of the present invention.

Of course, the present invention is not so limited to the particular arrangement or inclusion of data shown in FIG. 3. Certain information, for example, could be added or deleted, the data could be re-ordered, and other data structures could be used, consistent with this aspect of the present invention.

Figure 4:
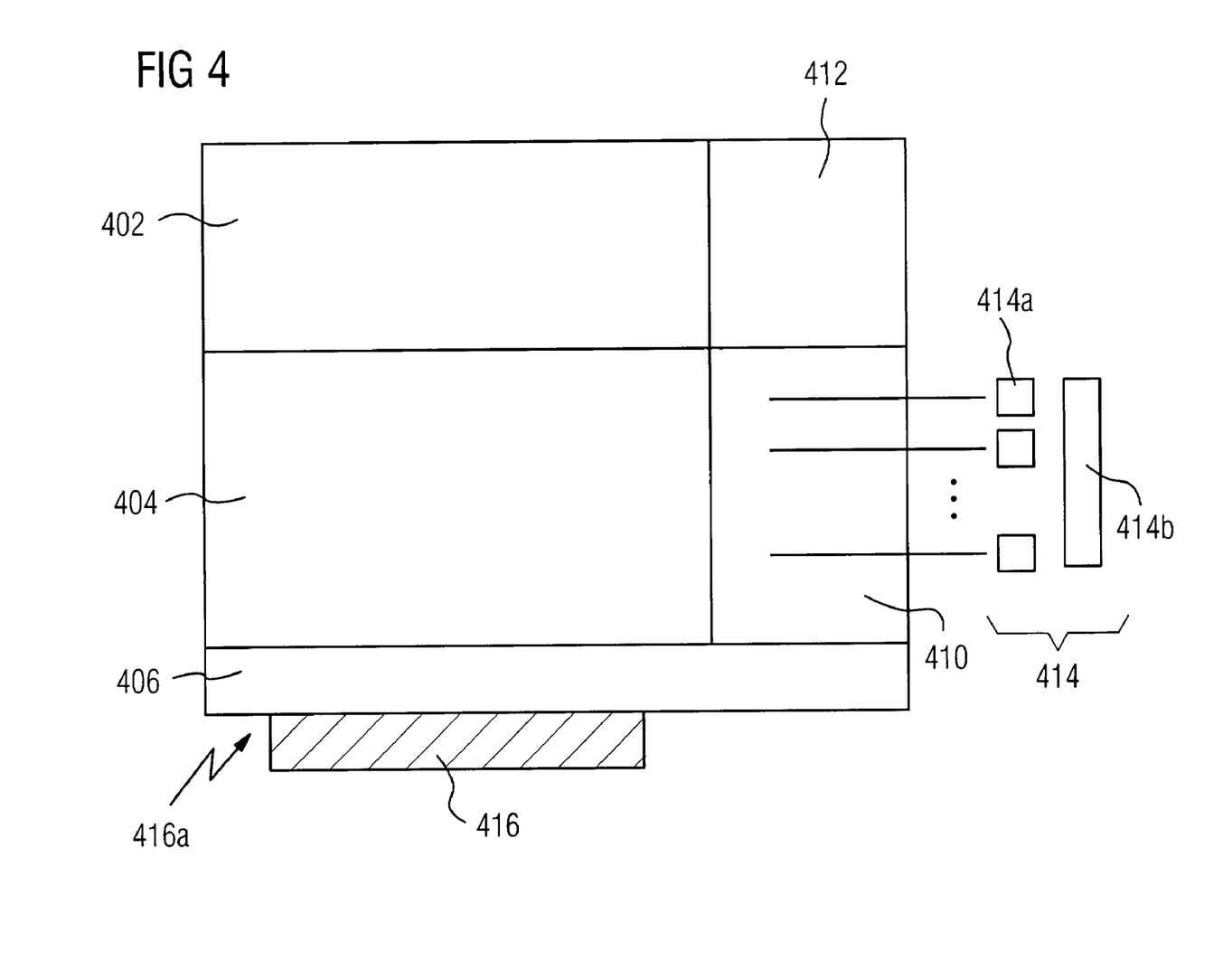
FIG. 4 is an architectural diagram illustrating the present invention.

Now that the exemplary system has been explained with respect to Active Resource Control, we turn now to a more detailed explanation of the present invention itself. In FIG. 4, there is shown the architecture for Active Resource Control of the present invention. As shown, a System normally comprises Standard Functionality, including, for example, non-Real Time Standard Functionality 402 and/or Real Time Standard Functionality 404. The Functionality sits on an operating system O/S 406 which controls the System. In addition to the Standard Functionality, there may also be provided Added Functionality, including, for example, non-Real Time and Real Time Functionality 408, 410, respectively.

As explained, additionally loaded and/or activated functionality imposes additional requirements, or loads, on the resources. This is particularly true of Real Time Systems, including such Resources as Time, Work Memory, Data Storage Capacity. Taking into account the already running functionality, the added Functionality may potentially cause resource limits to be reached. Thus, the strategy of the present invention is implemented to handle such cases in a way that best serves the tasks at hand.

In a first aspect, or step, of the invention, there is provided Pre-Activation Checking, which provides the first layer of Active Resource Control. This process performs a resource limit check after completing the specification of a configuration that causes additional functionality to be activated but before actually activating this configuration. Specifically, Pre-Activation Checking compares available free resources with the expected additional resource requirements of the functionality/module to be added/activated.

There are several methods of checking the availability of Resources. In one method, the (a1) actual resource usage is measured from the System. Normally, this data is stored by the host 30 in the database 34B as Resource Allocation Data.

Another method within the present invention is to check (a2) an average or maximum resource usage measured for some period of time, for example, the previous minute, hour, or day. In practice, these two methods haven proven to be more precise, yet requiring less effort. However, these methods are dependant on circumstances which occur in the past, and real events may be more sporadic and unanticipated.

The present invention further provides a process that predicts resource overloads. The invention provides for various predictions. A first is based on assumptions of the current system configuration. Another is based on statistical, theoretical, simulation or experimental knowledge about resource usage of individual control functions. Further, the predictive data maybe derived from combinations of control functions. This process requires more effort, but it is more deterministic. If the stored data regarding the availability of resources has integrity, the prediction itself provides a best/worst-case estimation.

In a similar, but different, aspect, the estimations regarding additional resources that are required are only based on the list of functions/modules to be activated. The estimations, as before, could employ stored statistical, theoretical, simulation or experimental knowledge about resource usage of such control functions. The data could be drawn as well from a combination with each other or with certain control functionality.

In both situations, the required knowledge may be obtained in similar, or even the same, set of experiments, simulations, etc. An example of such an experiment may be the measurement of the Run Time of Numerical Control Functionality for different Numerical Control setups in the course of automated software regression tests being done periodically. Such timing measurement results are currently used only to identify and evaluate software development problems. In the present invention, the timing results are stored in a database for resource control. In the preferred mode, the data does not comprise a single number for each Function but, rather, a range of worst/typical/best cases, or other empirical data, such as statistical distribution.

The invention not only provides for monitoring and detection of overloading Resource Controls, but also provides responses, i.e., Control. Advance Checking is useful as a first estimation on possible resource problems. However, unanticipated events can, and do, occur even with Advanced Checking. Therefore, the invention provides a flexible response that is designed to react differently depending on the accuracy of the database and on the probability of resource problems that has been computed. With less accurate data, it is more likely that unanticipated results arise and vice versa. Here now is an example of responses provided by the present invention according to the degree of accuracy of the data.

If even under best case estimation, the available resources are not sufficient, then the present invention provides, in one aspect, that the activation of the added functionality is blocked without override. However, and as will be explained, there is further provided Error Handling which aborts the added functionality, whilst leaving the critical Functions running. In another aspect, if available resources are sufficient under the best case estimation, yet not sufficient under the typical case estimation, the added functionality is blocked with a warning but allowing the user to override the blockage of the added Function.

If available resources are sufficient under typical case estimation but not sufficient under worst case estimation, a warning is issued to the user but the functionality is maintained active. If, even under worst case conditions, the available resources are sufficient, the Function is activated without any warning. If the analysis results in some probability measure of resource problems the different kinds of reaction (a–d, see above, others may apply) may be linked to certain value-ranges of this measure. As mentioned, the foregoing is an example of the responses that the invention provides in response to the degree of accuracy and, of course, variations thereof are within the scope of the invention.

The present invention was created to solve problems regarding overburdening Resources of a Numerical Control System, where a Trace Function was activated to trace the movement of a machine for diagnostics. It had been the case that the activated Trace Function caused the run time to reach the available cycle time of the cycle of interpolation task in a numerical control, for example an IPO cycle, and thus cause trouble in running the Numerical Control System. However, the present invention is not so limited to Trace Functionality and is similarly to be applied to any "addable" functionality (e.g. synchronous actions, additional numerical control kernel (NCK) software modules "compile cycles") that can be added/activated by the user (i.e., OEM Machine Tool Manufacturer, Solution Provider, etc.) Nor is the invention limited to Numerical Control Systems, but may be incorporated with all Control Systems where added Functionality causes overburdening of allocated Resources.

A second aspect, or step, of On-Line Checking 414 of the present invention is shown in FIG. 4 which provides a second layer of Active Resource Control. As opposed to the Off-Line Checking of the first step, the machine tool here is On-Line, that is, coupled to the System and active. It shall be appreciated that On-Line Checking is advantageous because it monitors the events of the Machine in Real Time, events as they unfold, and access data of the Machine through the network during Run-Time. Some of the techniques used to monitor the events of the Machine during the first step, i.e., Off-Line Checking, may be employed as well in On-Line Checking. However, care must be taken with On-Line operations, because the Machine is running under a Cycle Time and it must be ensured that the Machine complete its task(s) within the cycle time.

The present invention presents possible various ways to optimize this checking to the needs of On-Line processing in real-time systems and to tailor it to the specific situation at hand. In one aspect, the present invention performs run checking every cycle or, alternatively, only periodically depending on the load caused by resource checking and the dynamics of changes in resource usage. In another aspect, the present invention performs a full check of available resources and expected usage or, alternatively, limit On-Line Checking to changes in available resources. Where On-Line Checking must be kept relatively simple, the checking might be done on a general level, disregarding a specific configuration of Control Functionality or additional modules/functions. For example, the present invention provides a synchronous checking methodology, whereby checking is executed during run-time allocation of each IPO cycle and causing a running trace to be stopped (and alarm to be issued) if a certain limit is reached (e.g. 95% of cycle time used).

Especially for functionality that in itself is comprised of a number of resource consuming sub-steps (e.g Run-Time of Trace Functionality), where later steps may be omitted with limited effect on usability of the function, there are some additional possibilities for optimizing the on-line checking process.

In the case that the added functionality shifted toward the end of the cyclic task, the checking for available resources may be distributed within the activated additional functionality (e.g. Trace) in a way that checking is performed a plurality of times as illustrated by reference numeral 414a in FIG. 4. This is contrast to checking per cycle as shown by reference numeral 414b. In this manner, checking is executed along the course of functionality so that, in case of resource overload, the functionality until that time is completed and, only a part of the functionality is aborted. With this method, the steps that have been executed before aborting the functionality still provide something useful for completing the task during the next cycle perhaps or for debugging or troubleshooting purposes.

The present invention provides flexible responses to on-line detection of resource problems that may, for example, depend on the criticality of the added Function. In the case that a resource problem is persistent (e.g., long-term resource problems, or memory problems) the additional functionality is aborted (preferably with corresponding alarm) while the Standard Functionality is allowed to continue to run. If resource problem is intermittent (e.g., short-term resource problems, one cycle), the additional functionality should be aborted only for the cycle (preferably by message or alarm) and continued in the next cycle. This could occur, for example, during run-time upon the occurrence of a load peak of some system function. On the other hand, if functionality falls into a number of sub-steps, only the sub-steps that not yet have been completed will be aborted.

In another aspect of the invention, the limits and estimations used for On-Line Checking (e.g., best case, typical case, worst case estimation) are freely accessible, selectable and/or configurable by the user.

In the third process or step of Error Handling 416, there is provided a third layer of Active Resource Control. If for any reason, the On-Line Checking did not detect a resource problem so that a resource limit is finally reached, a suitable error handling exception 416 is provided by the present invention. In the present invention, errors caused by some activated additional functionality are aborted/disabled only while keeping the standard functionality alive. The present invention provides that this option is configurable, because, not all situations can operate without the additional functionality. When it is not possible, for example, for safety reasons, to run the system without the additional functionality, the whole system would have to be shut down in a safe way.

Now that a better appreciation of the invention is understood, an example of a specific operation thereof will be set forth with reference to FIG. 5, which illustrates an exemplary Control System and FIG. 6, which set forth the steps of Active Resource Control within the context of adding Trace Functionality.

Figure 5:
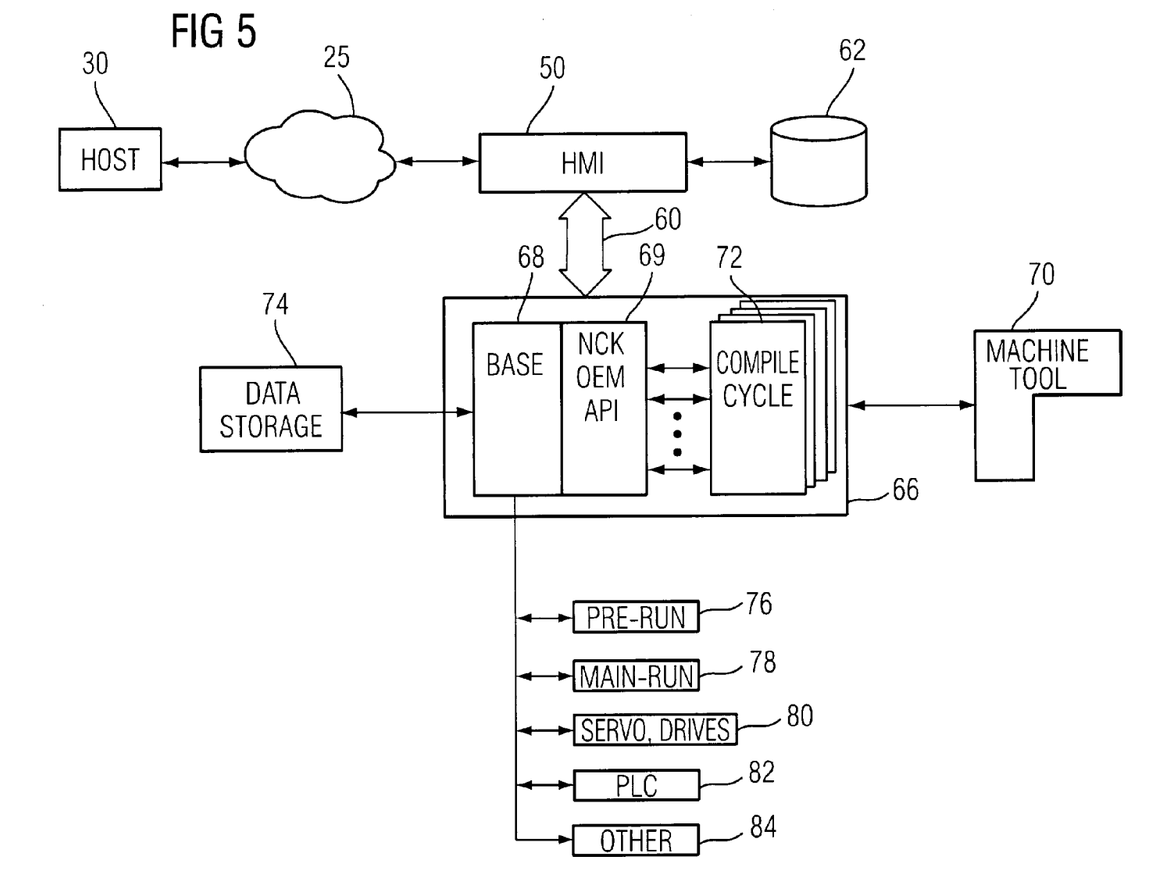
FIG. 5 is a schematic diagram illustrating an example of the present invention in operation.

As shown in FIG. 5, an operator, such as user 32 (FIG. 2), interacts, via a Human Machine Interface (HMI) 50 and an Interface 60, with a Control System 66 that controls Machine Tool 70. In the concrete example shown, the Control System 66 includes a base system 68, a Manufacturer Application Interface 69, that permits downloaded program code to be plugged into the Control System 66 as compile cycle(s) 72. For purposes of example, base system 68 provides a Trace Functionality for Data Capture that can be extended through Manufacturer Application Interface 69.

The Trace Functionality locally gathers data and stores it into a buffer or queue associated with any of the levels 76–84, after which a non-cyclic task takes buffer data and stores it into a file in data storage 74, which may be, for example, static RAM, such that it can later be merged into the trace data. The base system 68 is also in communication with various level control tasks, including pre-run control tasks 76, main (i.e., interpolator (IPO) level) control tasks 78, servo control and drive data control tasks 80, PLC data 82 and other information sources 84 within the machine control.

Figure 6:
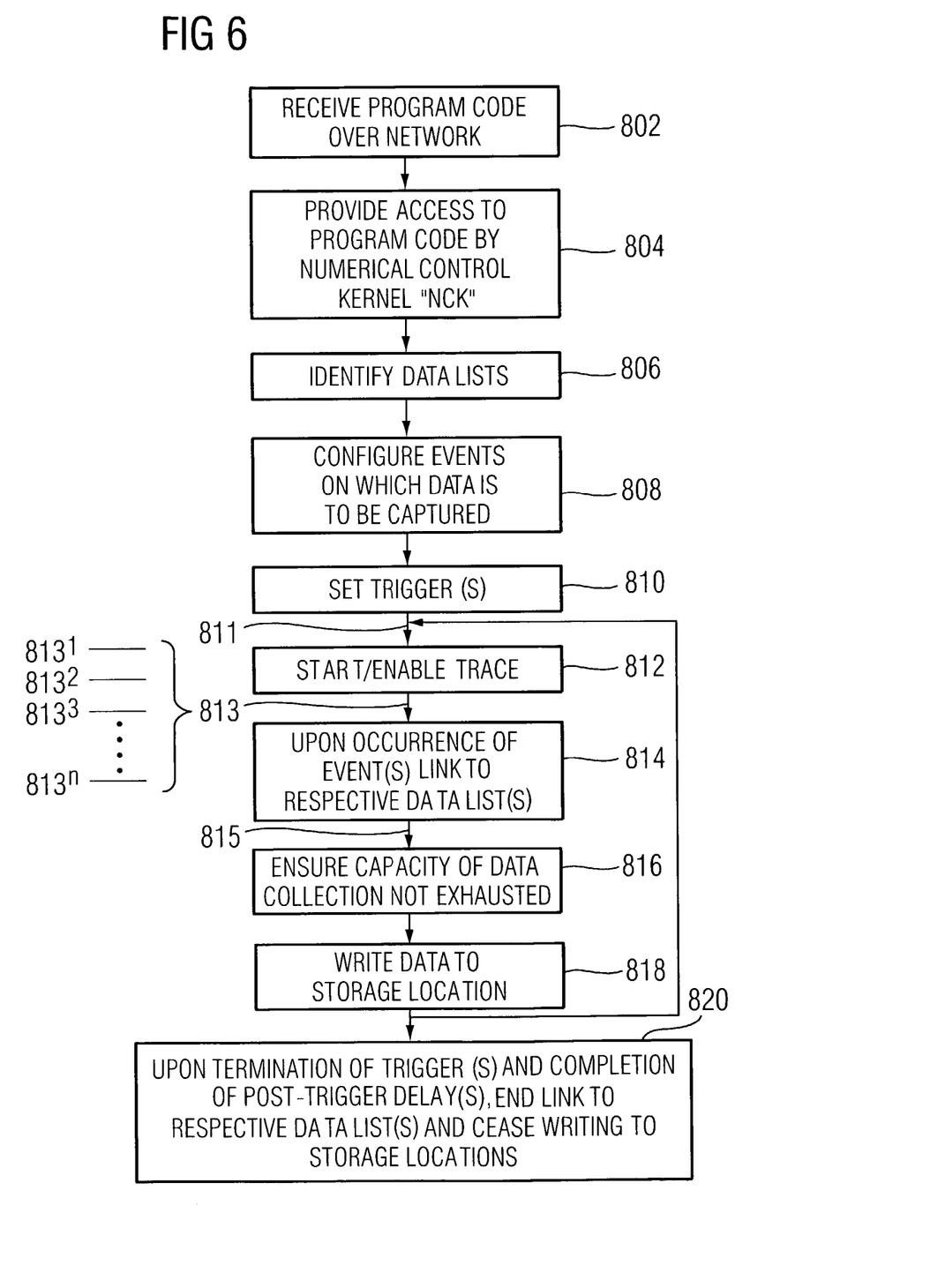
FIG. 6 is a flow diagram setting forth the processes of the present invention.

FIG. 6 provides a flow diagram that describes the steps associated with a method of performing Active Resource Control of a Data Capture System incorporating the additional Trace Functionality.

At first, the background process of a Data Capture is briefly described. A client system HMI 50 receives program code associated with a selected service from host 30 over network 25 at step 802. Access by the real-time controller 66 is provided to the downloaded program code at step 804 and program code is executed. At step 806, data lists are identified and configured, which specify which data are to be captured. At step 808, respective events are configured, on the occurrence of which the specified data are to be captured. At 810, triggers are set, also according to the accessed, downloaded code.

At this point, the Additional Functionality for a Trace is started/enabled at step 812 upon occurrence of the event configured at step 808. As detected at step 814, a link is made to the respective data list. Linking to a data list comprises storing a reference to which data list should be used. If the data collection capacity of the base system 68 has not been exhausted, as checked at step 816, then, based on the linked data list that contains a number of entries, each identifying one data to be recorded, all desired information is being accessed through base system 68 and, if required, through execution of the downloaded software. The specified data are written at step 818 to data storage 74, which may occur by way of an appropriate buffer.

As long as the capacity of data storage 74 is not exhausted, the trace continues until, at 820, occurrence of a respective trigger is detected. At the end of a post-trigger delay, assuming one had been specified, the link to the respective data list(s) are ended and writing to storage location 74 is terminated. If the data collection capacity had, at step 16, been exhausted, step 920 would also be invoked.

Preferably, a system using the data capture functionality described should use no more than, say, approximately 60% of available cycle time, which may help to avoid interference with any running applications. However, there are several instances where a Trace Functionality is in danger of exceeding this limit and even threatening overburdening resources.

For one thing, a "Normal Trace" by itself is capable of overloading the resources. While the Normal Trace is begun and ended upon definite events, and a transfer of the Trace Date occurs only when the trace is stopped, there are numerous applications triggered by Trace Functionality that can cause Resources to be overloaded. Trace Functionality triggers machine commissioning support. It activates failure detection and debugging of system problems. There are applications problems especially for complex applications with multiple channels, synchronous actions, etc. There is routinely run-time situations that handle, for example, sporadic run-time problems. Often, Traces include crash-handling procedures, such as complete data gathering via Kernel dump. There may even be logic analysis involved in a Trace, such as oscilloscope, tachometer, etc.

In addition, there are a number of common requirements for the captured Trace information that could cause a resource overload. These include, for example, the accommodation of data including system variables, drive signals, PLC flags, as well as events such as status, changes in status, binary signals, alarms, etc. The Trace Function accesses local user program data, such as flags in the PLC program. Trace Functions are also known to copy Traced Local Data into a suitable global variable.

Previously, after a crash or a stop, as soon as data are transferred, the resources are again made free. By contrast, the present invention aims to respond to a resource overload to possibly avert a crash. If a crash is unavoidable, high robustness of gathering the data after a fault occurs is desirable and may be accomplished in the following ways. Data, to the extent possible, is made available after a resource overload. As previously mentioned, sudden errors during-a-Trace do not necessarily lead to a data overflow and there is provided in the invention suitable reactions in the event of resource scarcity. If an event or condition does occur, the data files are preserved according to the invention.

As mentioned, the present invention provides multiple layers of Active Resource Control. As shown in FIG. 6, these layers are overlayed on the System. Needless to say, these layers may be implemented in conjunction or separately. As shown, the step of Pre-Checking 811 is initiated before the start of the Function, i.e., Trace Function as shown, the detailed steps of which have been discussed above. It will be appreciated from the Figure that the Pre-Checking step 811 is executed Off-Line, that is, before the Function is running.

In comparison, the On-Line Checking step 813 runs, on-line, that is concurrently with the Function as will be appreciated from FIG. 6. In other words, step 813 performs Active Resource Control in Real Time. Further, the granularity of the On-Line Checking step 813 is configurable, that is, may either be initiated On-Line in the course of the Function or as many times as desired. This is illustrated in the Figure as steps $813_1 \ldots _n$. It shall be appreciated that increasing the granularity may improve the probability of detecting a Resource overload before the System crashes. Upon detection of an overload, the invention further provides, as already described, a flexible response, which includes aborting the added Functionality without halting the entire system.

Another layer is the Error-Handling step 815, which has already been discussed. As will be appreciated from FIG. 6, step 815 also is activated during Run-Time. Indeed, the Error-Handling may be considered to run in the background, as it is triggered when a Resource limit is reached, which was not previously detected by, for example, the other Active Resource Control layers.

Figure 7A:
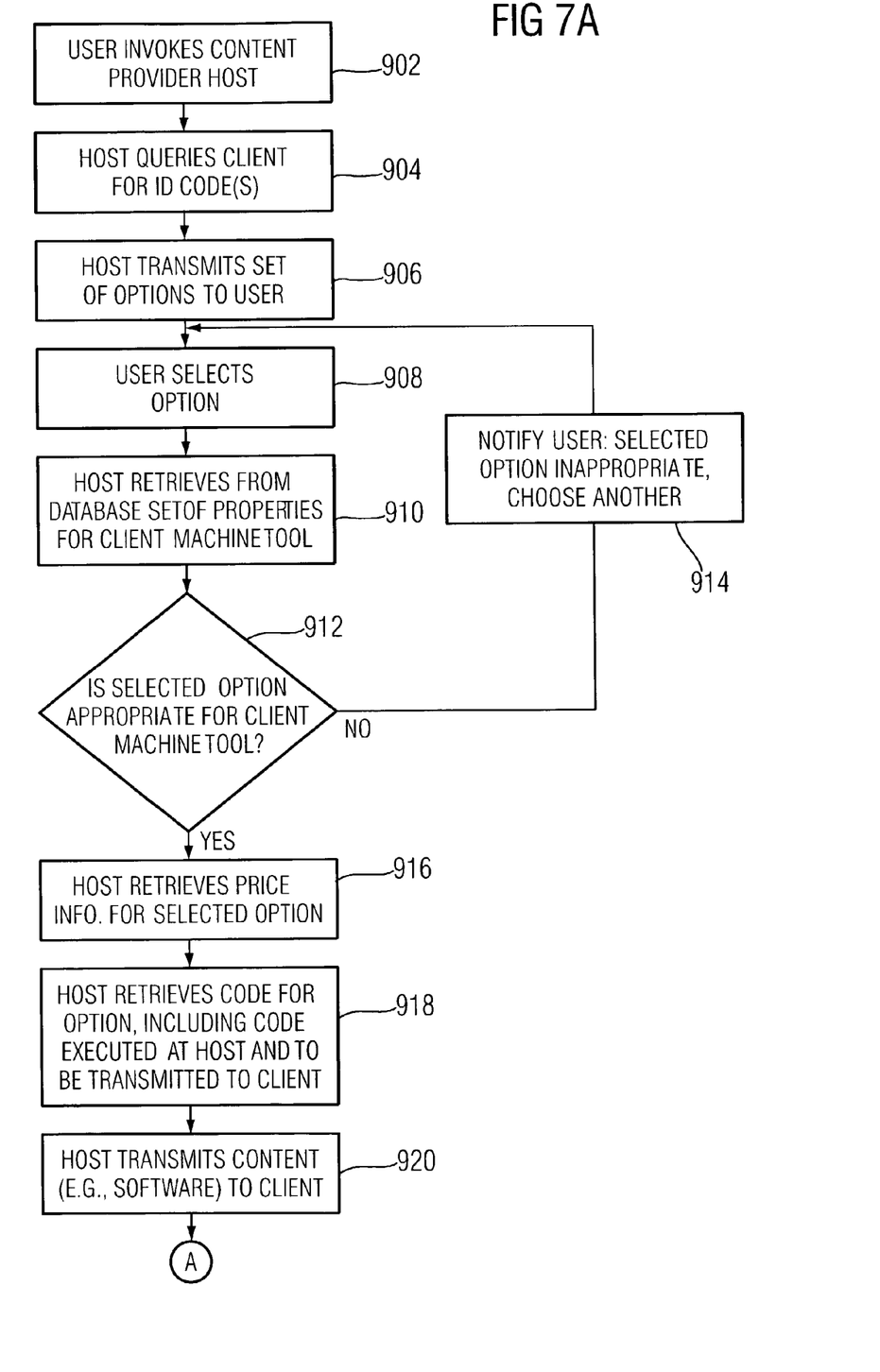
FIGS. 7A–7C is a flow diagram setting forth the processes illustrating how the present invention gathers data.
Figure 7B:
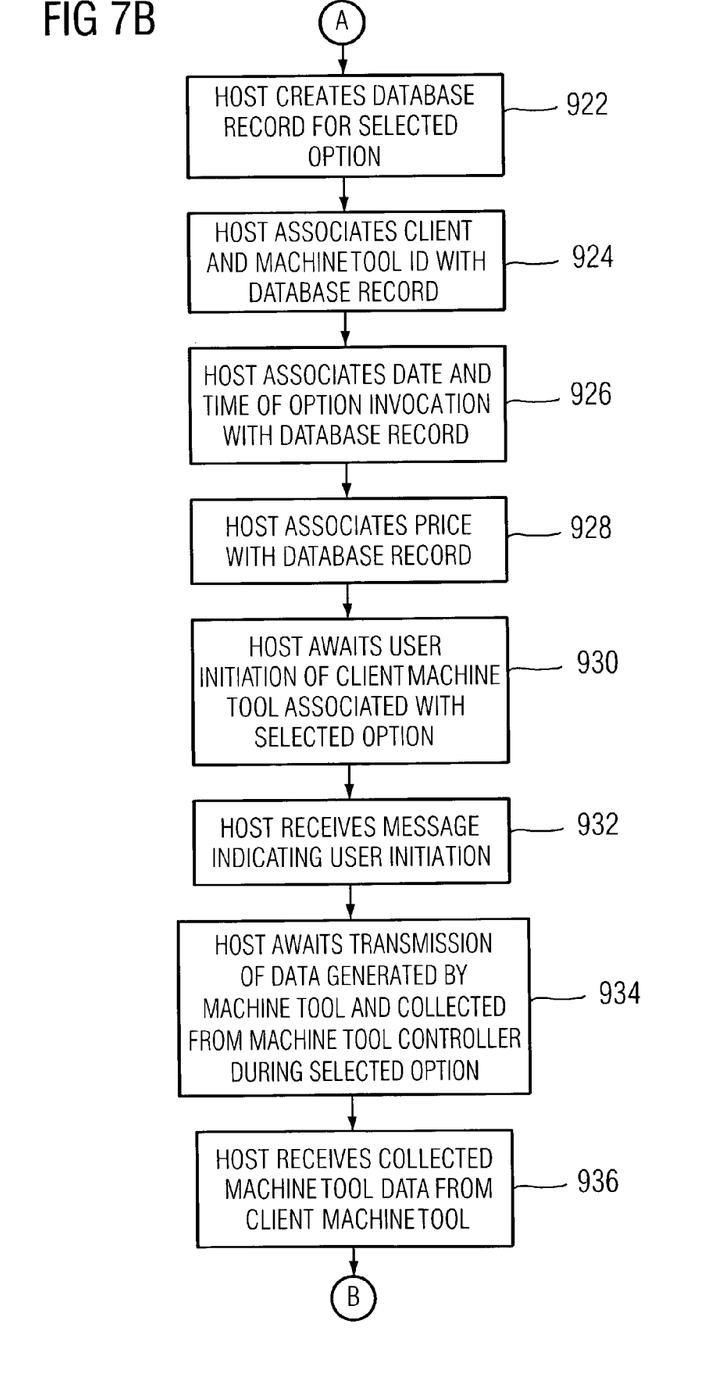

Now with respect to FIGS. 7A and 7B, the steps for the collection of the Resource Allocation data shall be described. A user of client 26, such as a machine tool. Host 30 queries the user for ID codes, that may include a customer ID code and a machine ID code, for example. Host 30, then, transmits to the user a set of options, which may include a list of Functions, at 906. The user transmits and the host 30 receives the user's selection of an option, at 908. Based upon the user's selection, host 30 retrieves from a database a set of properties for the client machine tool, at 910, and confirms, at 912, that the selected option is appropriate for the machine tool being operated by client 26. If not, host 30 notifies the user, at 914, that the selected option is inappropriate under the circumstances and that another option should be selected.

Otherwise, the host 30 retrieves information for the selected option, at 916, and retrieves content, e.g., program code, associated with the selected option, at 918, that may be executed at the host 30 and/or at the client 26. In addition, the information includes the specific Machine Tool Resource Allocation Data. In general, this data will be transferred to client 26, to be used, according to the description provided above, to assist in controlling the machine tool and gathering particular, resultant data. Following its retrieval, any content, such as program code, that has been retrieved by the host 30 is transmitted to client 26, at 920.

At 922, FIG. 7B, host 30 creates a database record for the transaction corresponding to the option selected by the user. Host 30 associates the client and machine tool IDs with the database record, at 924, thereby identifying the specific machine tool that executes the selected Function. In addition, at 926, host 30 associates the date and time the selected option is invoked with the database record established at 924. Moreover, host 30 may also associate the earlier-retrieved Resource Allocation Data with the database record, at 928.

Next, host 30 awaits user initiation of client machine tool behavior corresponding to the selected option and the associated, downloaded program code and/or data. The purpose of this waiting step, at 930, is to ensure user safety: particularly when moving machinery is involved, running the machinery should involve a manual step to help make sure the operator is aware of imminent machine activity before it begins and thereby avoid injury to personnel.

Host 30 receives a message, at 932, indicating that the user has initiated activity associated with the selected option. Host 30 also then awaits transmission, at 934, of data generated in connection with operating the machine tool and collected from the machine tool controller during the course of the selected option, including the Resource Allocation data gathered at the machine tool. Then, at 936, host 30 receives machine tool data collected from the client 26 machine tool and is stored in the database. In this manner, the Resource Allocation data is retrieved.

Figure 7C:
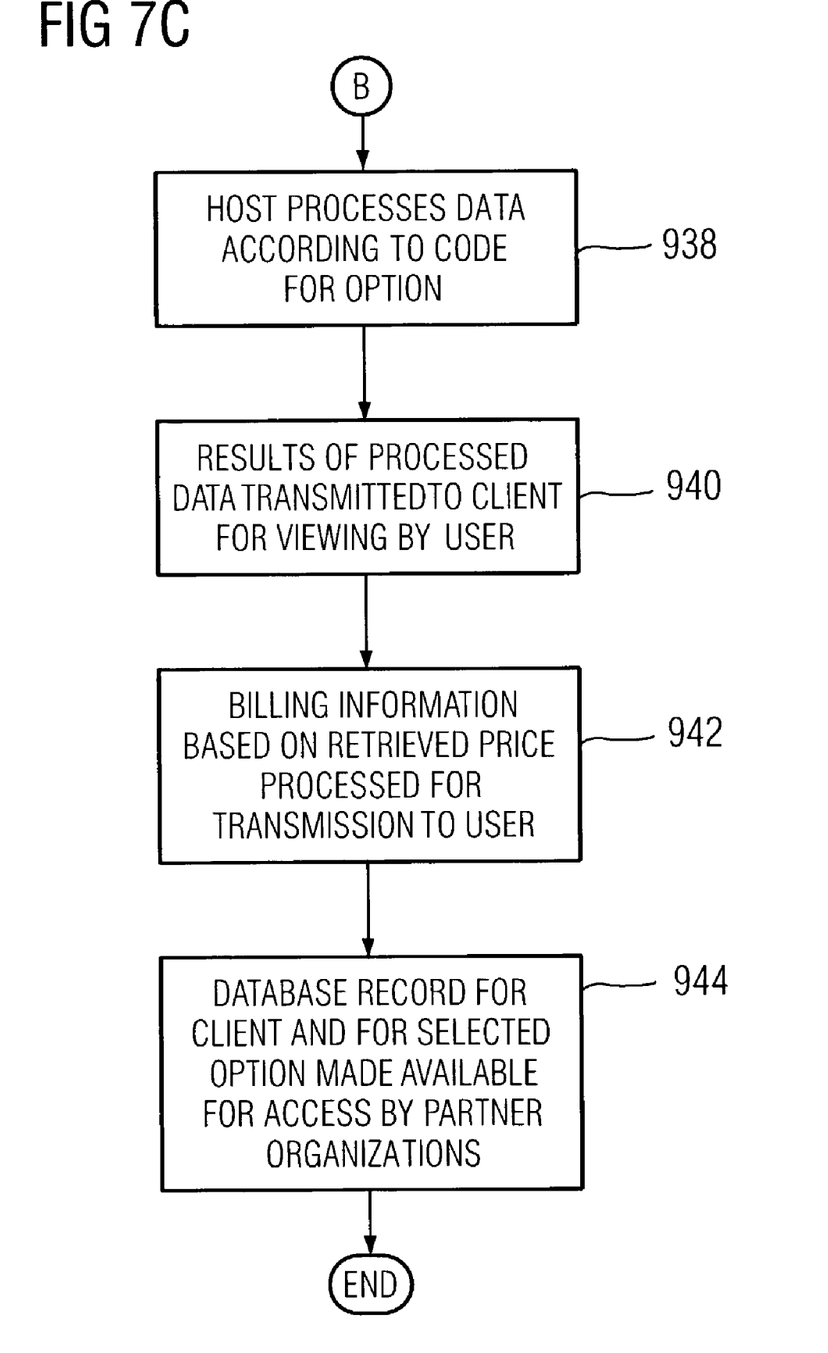

In FIG. 7C, host 30, at step 938, processes data collected from client according to code corresponding to the option selected by the user. Then, at step 940, the results of processing the data uploaded from client 26 (e.g., generated by numerical analysis module 512, of FIG. 5) are transmitted to client 26, or, in some embodiments, to an entity that owns or controls it. When the session or transaction comes to a close, or at another suitable time, billing information is retrieved or generated, at 942, based on retrieved price information and is processed for transmission to the user or its owner or operator. In step 944, the database and selected option are made available for access by partner organizations. The order and the particulars of the above-steps may be varied. Moreover, other steps may be added without departing from the scope of this aspect of the present invention.

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims. For example, the ordering of method steps is not necessarily fixed, but may be capable of being modified without departing from the scope and spirit of the present invention.

What is claimed is:

1. A method for active resource control of added functionality in a computerized process for controlling a motion control machine, the computerized process for controlling the motion control machine having at least one resource, the method comprising the steps of:

during run-time of the computerized process for controlling the motion control machine, in which motion associated with the motion control machine is controlled by the process in real time, initiating an added functionality that uses at least a portion of the resource of the computerized process for controlling the motion control machine; and performing on-line checking at the added functionality by detecting during run time of the real-time computerized process whether the added functionality causes the process for controlling the motion control machine to reach a limit of the resource.

2. The method of claim 1, further comprising, in response to detecting that the added functionality reaches the resource limit the step of providing at least one response that responds according to a degree of importance of the added functionality.

3. The method of claim 2, wherein the response halts only the added functionality.

4. The method of claim 3, wherein the added functionality is aborted for a current cycle.

5. The method of claim 3, wherein results of the added functionality are retrieved before aborting the added functionality.

6. The method of claim 5, wherein information regarding aborting the added functionality is indicated in a result of the added functionality.

7. The method of claim 6, wherein said information indicates an incompleteness of results of the added functionality.

8. The method of claim 3, wherein the halting of the added function is indicated by an alarm.

9. The method of claim 1, wherein the numerical control process is cyclic and the step of on-line checking the numerical control process determines whether the resource is overburdened within a cycle.

10. The method of claim 1, further comprising the step of setting a granularity of the on-line checking to check at a plurality of intervals of a cycle of the numerical control process.

11. A method for active resource control of added functionality in a computerized process for controlling a motion control machine, the computerized process for controlling the motion control machine having at least one resource, the method comprising the steps of:

during the run-time of the computerized process for controlling the motion control machine, in which motion associated with the motion control machine is controlled by the process in real time, initiating an added functionality that uses at least a portion of the resource of the computerized process for controlling the motion control machine; and error handling a reached resource limit caused by the added functionality.

12. The method of claim 11, further comprising the step of aborting the additional functionality while maintaining a standard functionality.

13. The method of claim 11, wherein the step of error handling aborts the added functionality, while leaving a standard functionality alive.

14. The method of claim 11, wherein the step of error handling is configurable.

15. The method of claim 11, wherein the step of error handling, when it is not possible to run the computerized process for controlling the motion control machine without the additional functionality, comprises the step of shutting down a system on which the process is beginning to avoid an unsafe condition.

16. A method for active resource control of added functionality in a computerized process for controlling a motion control machine, the computerized process for controlling the motion control machine having at least one resource, the method comprising the steps of:

selecting, before run-time of the computerized process for controlling the motion control machine, in which motion associated with the motion control machine is controlled by the process in real time, initiating an added functionality to be added to the process that uses at least a portion of the resource of the computerized process for controlling the motion control machine; and performing off-line checking of the added functionality by detecting off-line, before the run time of the real-time computerized process, whether the added functionality causes the process for controlling the motion control machine to reach a resource limit of the resource.

17. The method of claim 16, further comprising, in response to detecting that the added functionality reaches the resource limit, the step of providing at least one response that responds according to a degree of an importance of the added functionality.

18. The method of claim 17, wherein the response halts only the added functionality.

19. The method of claim 17, wherein, when available resources are not sufficient, activation of the added functionality is blocked without override.

20. The method of claim 17, wherein the response aborts the added functionality, while leaving standard functions running.

21. The method of claim 17, wherein, if available resources are sufficient under a best case, and not sufficient under a typical case, the added functionality is blocked with a capability to be reinstated by manual override.

22. The method of claim 17, wherein, if available resources are sufficient under a typical case but not sufficient under a worst case, a warning is issued but the added functionality is maintained active.

23. The method of claim 18, wherein the aborting of the added functionality is indicated by an alarm.

24. The method of claim 16, further comprising the step of setting a granularity of the on-line checking to check at a plurality of intervals of a cycle of the process.

25. An active resource control apparatus for monitoring added functionality in a computerized process for controlling a motion control machine, the computerized process for controlling the motion control machine having at least one resource, comprising:

added functionality that uses at least a portion of the resource that is added to the computerized process for controlling the motion control machine, in which motion associated with the motion control machine is controlled by the process in real time; and a checker that checks the added functionality by detecting whether the added functionality causes the real-time computerized process to reach a resource limit of the resource.

26. The apparatus of claim 25, wherein the checker checks while the computerized process for controlling the motion control machine is on-line.

27. The apparatus of claim 25, wherein the checker checks while upon the computerized process for controlling the motion control machine reaching a resource limit.

28. The apparatus of claim 25, wherein the checker checks before the computerized process for controlling the motion control machine is on-line.

29. A method for active resource control for monitoring added functionality in a computerized process for controlling the motion control machine having at least one resource, the method comprising the steps of:

added functionality that uses at least a portion of the resource that is added to the computerized process controlling the motion control machine, in which the motion associated with the motion control machine is controlled by the process in real time; and providing multiple layers of checking that check at multiple layers of the computerized process for controlling the motion control machine whether the added functionality causes the computerized process for controlling the motion control machine to reach a resource limit of the resource.

30. The method of claim 29, wherein at least one layer checks whether the added functionality causes the computerized process for controlling the motion control machine to reach a resource limit of the resource on-line, during runtime of the computerized process.

* * * * *